United States Patent [19]
Richard

[11] Patent Number: 4,567,519
[45] Date of Patent: Jan. 28, 1986

[54] PROCESS FOR THE ADAPTATIVE CODING AND THE DECODING OF A TELEVISION PICTURE AND DEVICES FOR PERFORMING THIS PROCESS

[75] Inventor: Christian Richard, Noyal sur Vilaine, France

[73] Assignee: Thomson-CSF, Paris, France

[21] Appl. No.: 591,479

[22] Filed: Mar. 20, 1984

[30] Foreign Application Priority Data

Mar. 22, 1983 [FR] France ................ 83 04671

[51] Int. Cl.⁴ .................................... H04N 7/12
[52] U.S. Cl. .......................... 358/135; 358/133
[58] Field of Search ............. 358/133, 135, 138

[56] References Cited

U.S. PATENT DOCUMENTS

| | | | |
|---|---|---|---|
| 3,071,727 | 1/1963 | Kitsopoulos | 358/135 X |
| 3,824,590 | 1/1974 | Limb | 358/135 X |
| 4,268,861 | 5/1981 | Schreiber | 358/138 |

FOREIGN PATENT DOCUMENTS

| | | |
|---|---|---|
| 0022713 | 8/1980 | European Pat. Off. |
| 0063990 | 9/1982 | European Pat. Off. |
| 2559263 | 7/1977 | Fed. Rep. of Germany |
| 3111823 | 3/1982 | Fed. Rep. of Germany |

OTHER PUBLICATIONS

IEE Proceedings-F., vol. 127, No. 5, Oct. 1980, pp. 405-409, Stevenage, Herts., GB H. Gharavi: "Bandwidth Compression of Digital Colour ...."
IEEE National Telecommunications Conference, Dec. 1-3, 1975, New Orleans, vol. 1, pp. 22-10 a 22-17, IEE, New York, U.S., P. J. Ready et al.
Fernseh-Und Kino-Technik, vol. 37, No. 1, Jan. 1983, pp. 15-20, Berlin, DE, H. Amor: "Quellencodierung der Feinstrukturkomponenten...."

Primary Examiner—Howard W. Britton
Assistant Examiner—Victor R. Kostak
Attorney, Agent, or Firm—Roland Plottel

[57] ABSTRACT

This coding process makes it possible to reduce the information quantity of a television picture. A coding device comprises: a device for detecting the high brightness gradient points; a device detecting, from among the blocks formed from among four consecutive picture points so-called high gradients blocks containing at least one high gradient point; a device for coding points of the high gradient blocks, which carries out a differential coding of the brightness values and a quantification in accordance with a first non-linear scale; a device for coding points of low gradient blocks, which carries out a differential coding and a quantification in accordance with a second non-linear scale, the coding only being carried out for alternate points of the low gradient blocks, a device for decoding points of the high gradient blocks, and a device for decoding points of the low gradient blocks, the brightness values of the uncoded points of the low gradient blocks being reconstituted by linear interpolation on the basis of the decoded brightness values of adjacent points.

6 Claims, 7 Drawing Figures

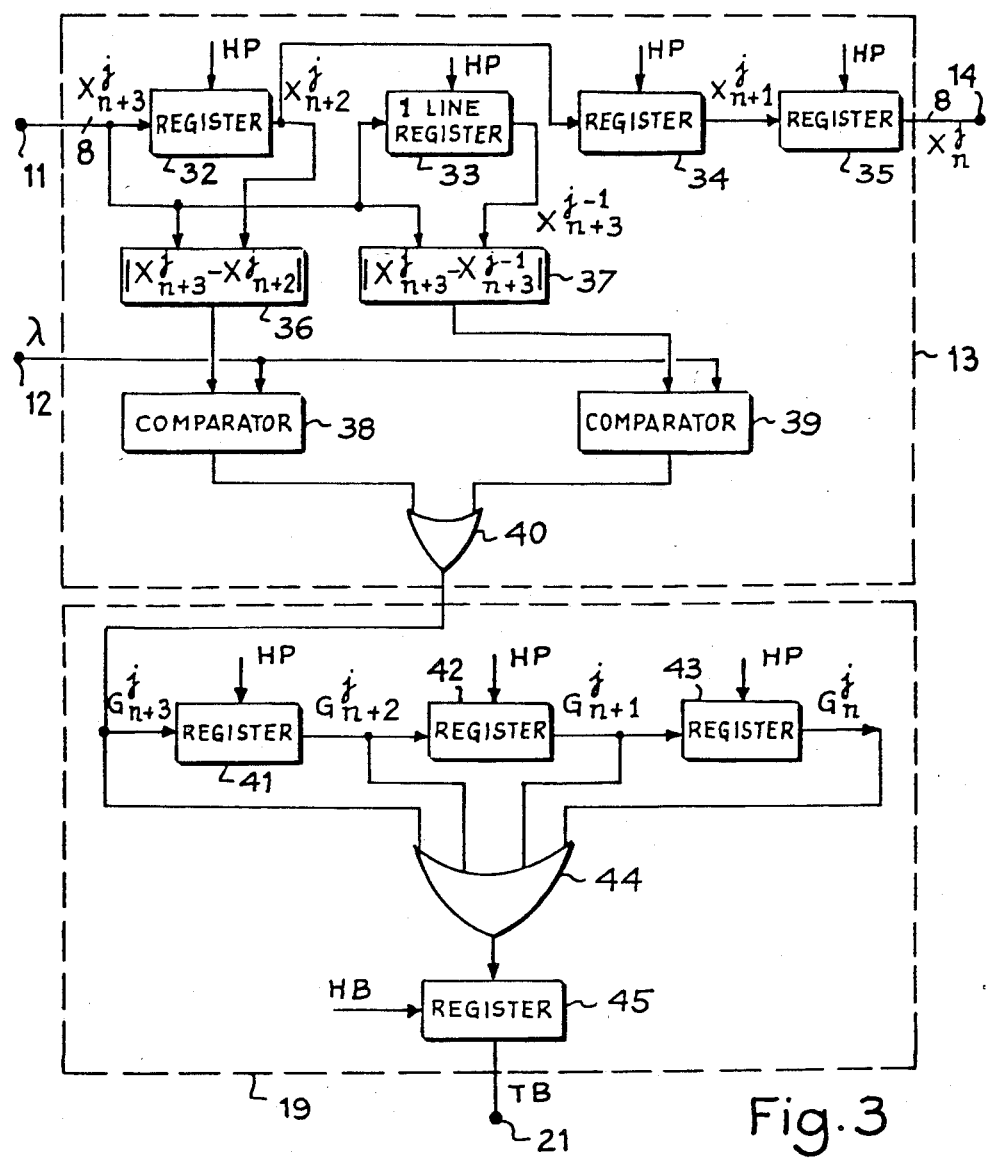
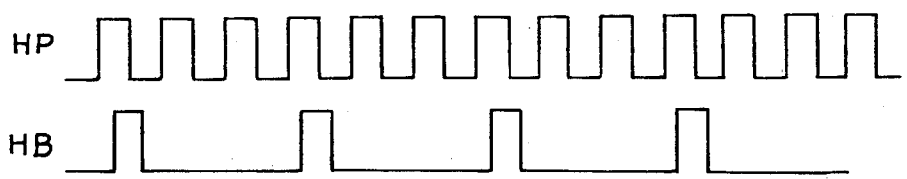
Fig.3
Fig.4

PROCESS FOR THE ADAPTATIVE CODING AND THE DECODING OF A TELEVISION PICTURE AND DEVICES FOR PERFORMING THIS PROCESS

BACKGROUND OF THE INVENTION

The invention relates to a coding and decoding process making it possible to reduce the information quantity of a television image or picture in order to facilitate its transmission or storage. This process more particularly makes it possible to code and decode a single picture, such as that analyzed by certain cameras on board aeria reconnaissance aircraft, a scan or sweep being performed on the one hand by the movement of the aircraft and on the other by a linear optical sensor analyzing a single line and which can be constituted by a plurality of charge coupled devices (CCD), which are placed end to end. Such a camera consequently analyzes a single picture having an infinite number of lines. In this case, inter-image or inter-frame coding methods cannot be used.

Various adaptative coding processes are known, which code the brightness values of a picture in point-by-point manner or by constant brightness ranges using the redundancy of brightness informations in the same line or frame. However, the process according to the invention makes it possible to obtain a much better information compression level.

SUMMARY OF THE INVENTION

The present invention therefore mainly relates to a process for the adaptative coding and the decoding of a television picture, each point in said picture being represented by its brightness value and in which coding consists of:

regrouping the points of the picture in blocks of $N_P$ consecutive points of the same line, $N_P$ being a fixed integer, detecting the points, called high brightness gradient points, whose brightness value differs at least by a value $\lambda$ from that of one of the adjacent points on the same line or on the preceding line, coding each block, called high brightness gradient block, containing at least one high gradient point, by calculating the difference between the brightness value of each point and a value obtained by coding and then decoding the brightness value of the immediately preceding point and by quantifying this difference according to a first non-linear quantification scale, coding each block, called low brightness gradient block, containing no high gradient point, by calculating for at least one point of the block the difference between the brightness value of this point and a value obtained by coding and then decoding the brightness value of a so-called reference point from among the points which have previously been coded, followed by the quantification of the value of this difference according to a second non-linear quantification scale, such that the quantification error is smaller for the low values than for the high values of the difference, distinguishing by a logic indicator, the coded data corresponding to the high gradient blocks on the one hand and those corresponding to the low gradient blocks on the other, and wherein decoding consists of:
identifying the coded data corresponding to the high gradient blocks on the one hand and those corresponding to the low gradient blocks on the other, on the basis of the value of the logic indicator, decoding each high gradient block by determining a decoded value of the brightness of each of its points by a quantification of its coded value in accordance with a reverse scale compared with the first quantification scale used for coding and by an addition of the thus obtained value and the decoded value of the brightness of the immediately preceding point, decoding each low gradient block by determining a decoded value of the brightness of each point having been coded and belonging to said block by a quantification of its coded value, in accordance with a reverse scale compared with the second quantification scale used for coding, and by an addition of the thus obtained value and the decoded value of the brightness of the corresponding reference point, and by determining a decoded value of the brightness of each point not having been coded and belonging to said block, by an interpolation as a function of the decoded values of the brightness of adjacent points on the same line and on the preceding line.

Another object of the invention is a coding device and a decoding device for performing this process.

The invention will be better understood and other details will be made apparent from the following description relative to the drawings.

BRIEF DESCRIPTION OF THE DRAWNGS

FIGS. 3 and 5 are more detailed block diagrams of parts of this embodiment.

FIG. 4 is a time chart of an example of timing signals.

DETAILED DESCRIPTION OF THE INVENTION

Figure 1:
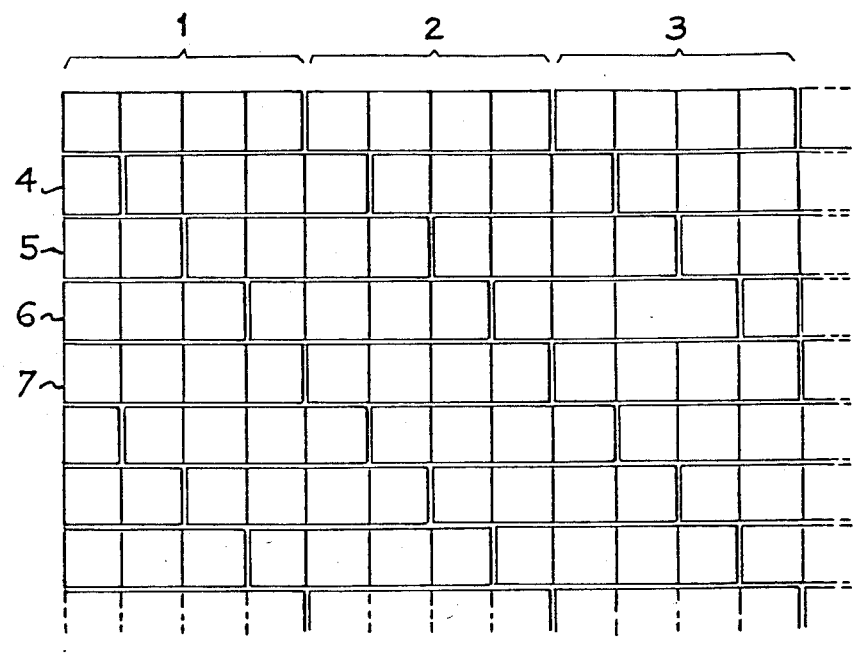
FIG. 1 shows an example of an image portion and illustrates the process according to the invention.

The following description considers in exemplified manner a single unframed, black and white image or picture, but this in no way limits the scope of the invention, which can be applied to a sequence of standard television pictures. Each point of the picture to be coded is represented by the digital value of its brightness. The process according to the invention is an adaptative process, because the coding of the brightness value of one point is carried out differently as a function of the brightness gradient of the picture at this point. If the considered point is located on a contour of an object, the brightness value of this point differs greatly from that of at least one of its neighbours. However, if the point in question is located in an approximately uniform area of the picture, the brightness value at this point differs but little from the brightness value of all the immediately adjacent points. The information necessary for representing these two types of area are not only different as a result of their quantity, but also as a result of their nature. An approximately uniform area has less information than an area in which contours are located. Moreover, this information corresponds to smaller variations in the brightness value. The coding and decoding process according to the invention is adaptative in order to be able to treat these two cases differently. To choose a different type of coding for each point would make coding and decoding more complicated and would greatly increase the quantity of coded information, because the latter would have to contain information indicating the nature of the coding used for each point, this being why the coding process according to the invention retains the same coding type for a complete block of points. In addition all these blocks are of the same length. Coding by blocks of variable length would require a significant information quantity for coding the length of each block. The process according to the invention consists of regrouping the points of the picture by blocks of $N_p$ consecutive points on the same lines, $N_p$ being a fixed integer, e.g. equal to 4. It then consists of making a distinction between two types of block and respectively coding them according to two different coding types. The first type of block is constituted by so-called high brightness gradient blocks containing at least one high brightness gradient point, i.e. whose brightness value differs by at least one absolute fixed value $\lambda$ compared with that of an adjacent point on the same line or the preceding line. For example, $\lambda=10$ for a brightness, whose values range between 0 and 255. The second type of block is constituted by low brightness gradient blocks containing no high brightness gradient point. The high gradient blocks correspond to the contours of the objects represented by the picture, whereas the low gradient blocks correspond to areas where the brightness is constant or varies only slightly.

Each point of a high gradient block is coded by a differential coding consisting of calculating the difference between the value of its brightness and a value obtained by coding and then decoding the value of the brightness of the immediately preceding point, followed by the quantification of this difference in accordance with a first non-linear quantification scale. This differential coding is carried out by using for the reference value, not the exact value of the brightness of the immediately preceding point, but by using its coded—decoded value, because for the subsequent decoding the reference value used will not be the exact value of the brightness of the preceding point and will instead be its slightly erroneous decoded value. The use of an identical reference value for coding and then decoding avoids the introduction of a supplementary error. The first non-linear quantification scale is such that the quantification errors are lower for the high values than for the low values of the brightness difference, because in the high gradient blocks the brightness differences between the individual points are considerable in general terms. Thus, the quantification errors are statistically minimized.

The points of the high brightness gradient blocks are not all coded, because the brightness values are small, or even non-existent within each block. At least one of the points of each block is coded by a differential coding whilst the other points are not coded at all. However, their brightness value can be reconstituted by an interpolation. For example, the first and third points of each block are coded by differential coding constituting of calculating the difference between the brightness value of the considered point and a value obtained by coding and then decoding the brightness value of a so-called reference point, chosen from among the points which have already been coded and then quantifying the value of this difference in accordance with a second non-linear quantification scale. For example, the first point of each low gradient block is differentially coded with, as its reference point, the fourth point of the immediately preceding block, no matter what the block type, and the third point of each low gradient block is coded with, as its reference point, the second point of the same block. The second non-linear quantification scale is such that the quantification error is smaller for the low values than for the high values of the brightness difference. The brightness values are generally small within a low gradient block, so that the errors due to quantification are statistically minimized. In this example, the second and fourth points of each low gradient block are not coded, so that there is a significant reduction in the information quantity. Moreover, in this block, the brightness values of the points of the high gradient blocks are coded by three bit binary words, whereas the brightness values in the low gradient blocks are coded by two bit binary words.

Statistically, in ordinary pictures or images, the high gradient blocks represent approximately 15% of all the blocks of four points constituting a picture or image. This percentage is directly linked with the number of points $N_P$ contained in each block. If $N_P$ is chosen higher than 4, the percentage of high gradient blocks is greater and consequently the information quantity to be transmitted is higher. The type of each block must be distinguished by a logic indicator, in order to be able to differently code the two types of blocks. This logic indicator is constituted by one bit per block and consequently increases the information quantity in inverse proportion to the number of points in each block. The choice of the number $N_P$ of points per block is consequently a compromise between these two constraints.

The identification of the start and finish of the blocks requires no separator, because each block contains a constant number of points and it is merely necessary to carry out a count to determine, both during coding and decoding, where each block starts and finishes.

Decoding firstly consists of identifying the type of each block on the basis of the logic indicator value. Each point of a high gradient block is decoded by quantifying the coded value in accordance with a scale which is the reverse of the first quantification scale used for the coding, in order to obtain a brightness difference value between 0 and 255, followed by the addition of this brightness difference value to the decoded brightness value of the preceding point.

For low gradient blocks, each point which has been coded is decoded by quantifying the coded value in accordance with a quantification scale which is the reverse of the second quantification scale used for coding, followed by the addition of the value obtained to the decoded brightness value of the reference point, which is in this case the preceding point. In this example, the points which are coded in this way are the first and third points of each low gradient block. The reference point of the first point is the last point of the preceding block whilst the reference point of the third point is the second point of the same block, as in the case of coding. The brightness values of the second and fourth points of each low gradient blocks, which have not been coded, are reconstituted by an interpolation as a function of the decoded brightness values of adjacent points on the same line and on the preceding line. For example, the decoded brightness value for the second point is equal to the half-sum of the decoded brightness value of the first point of the same block and the decoded brightness value of the point following the homologous point on the preceding line. In the same way, the decoded brightness value of the fourth point of a low gradient block is equal to the half-sum of the decoded brightness value of the third point of the same block and the decoded brightness value of the point following the homologous point on the preceding line. The interpolation method can have numerous variants, particularly with regards to the weighting factors used. The choice of the points to be coded and the points not to be coded in the low brightness gradient blocks can differ from that described hereinbefore, the scope of the invention not being limited to this example. In the case where a greater coding and decoding error of the low gradient ranges can be accepted without disadvantage, it is possible to only differentially code a single point in each low gradient block and to reconstitute by interpolation the brightness values of all the other points of the block. It should be noted that, in a low gradient block, the brightness values differ only slightly compared with those of the homologous points on the preceding line, because if this was not the case for at least one of these points, the block would be looked upon as a high gradient block. Therefore, the interpolation errors are small.

The reconstitution of brightness values by interpolation leads to an error which, in the reconstituted picture, causes defects which can be visible and disturbing if they have a simple periodic or cyclic structure. It is for this reason that an improvement of the process consists of regrouping the points of an image by blocks having a number $N_P$ of fixed points, but by displacing by at least one point the blocks of two successive lines, in order to ensure that the defects due to the interpolation errors on a line do not precisely coincide with the defects appearing on the following line and do not coincide with the defects appearing on the preceding line. FIG. 1 shows in exemplified manner a portion of an image, in which the points are regrouped in blocks of four with a displacement of one point between the blocks of two consecutive lines. The first line consists of a sequence of blocks of four points 1, 2, 3, etc, the second line a first block 4 only containing a single point and then a sequence of blocks containing four points. The third line comprises a first block 5 containing two points and then a sequence of blocks containing four points. The third line comprises a first block 6 containing three points and then a sequence of blocks having four points. The fifth line consists of a first block 7 containing four points and then a sequence of blocks containing four points, so that it is identical to the first line. The following lines are formed in the same way as the first five lines. In this case, blocks 4, 5 and 6 which do not contain four points are e.g. coded by the same type of differential coding as the high gradient blocks. As this allocation of points to blocks is strictly periodic, counting makes it possible to locate the first and last points of the blocks for coding and decoding, without it being necessary to add information for forming separators.

The process according to the invention makes it possible to obtain a compression level of approximately 4 for one type of picture or image in which conventional adaptative differential coding processes lead to a level of approximately 3.

A variant of the process according to the invention, for obtaining a better restoration of the low gradient areas in a picture, consists of differently coding the high gradient points and the low gradient points of high gradient blocks, by using a different non-linear quantification scale for these two types of points. For example, the quantification scale used for the low gradient points of the high gradient blocks can be the same as that used for coding the points of the low gradient blocks. This variant makes it possible to reduce errors due to the quantitifation in the high gradient areas, but increases the information quantity, because it is necessary to define which quantification scale has been used for coding for each point of a high gradient block. Naturally, decoding consists of identifying for each point of a high gradient block, which quantification scale is to be used for decoding its brightness value. For example, the brightness value of the high gradient points can be coded with three bits, plus one indicator bit of the type of point, whilst the low gradient points can be coded with two bits, plus one indicator bit of the type of points. In this case, the information quantity is greater, because there is an extra bit for each point of a high gradient block. However, the quantification scale used for coding the low gradient points is a scale minimizing the quantification errors for this type of point, so that the decoded image quality is better in the blocks where there are both high gradient points and low gradient points.

It falls within the scope of the routine activity of the Expert to adapt the process according to the invention to colour television. Each point is then represented by a brightness value and two colour difference values. It is coded by separately coding these three informations in accordance with the process described hereinbefore.

Figure 2:
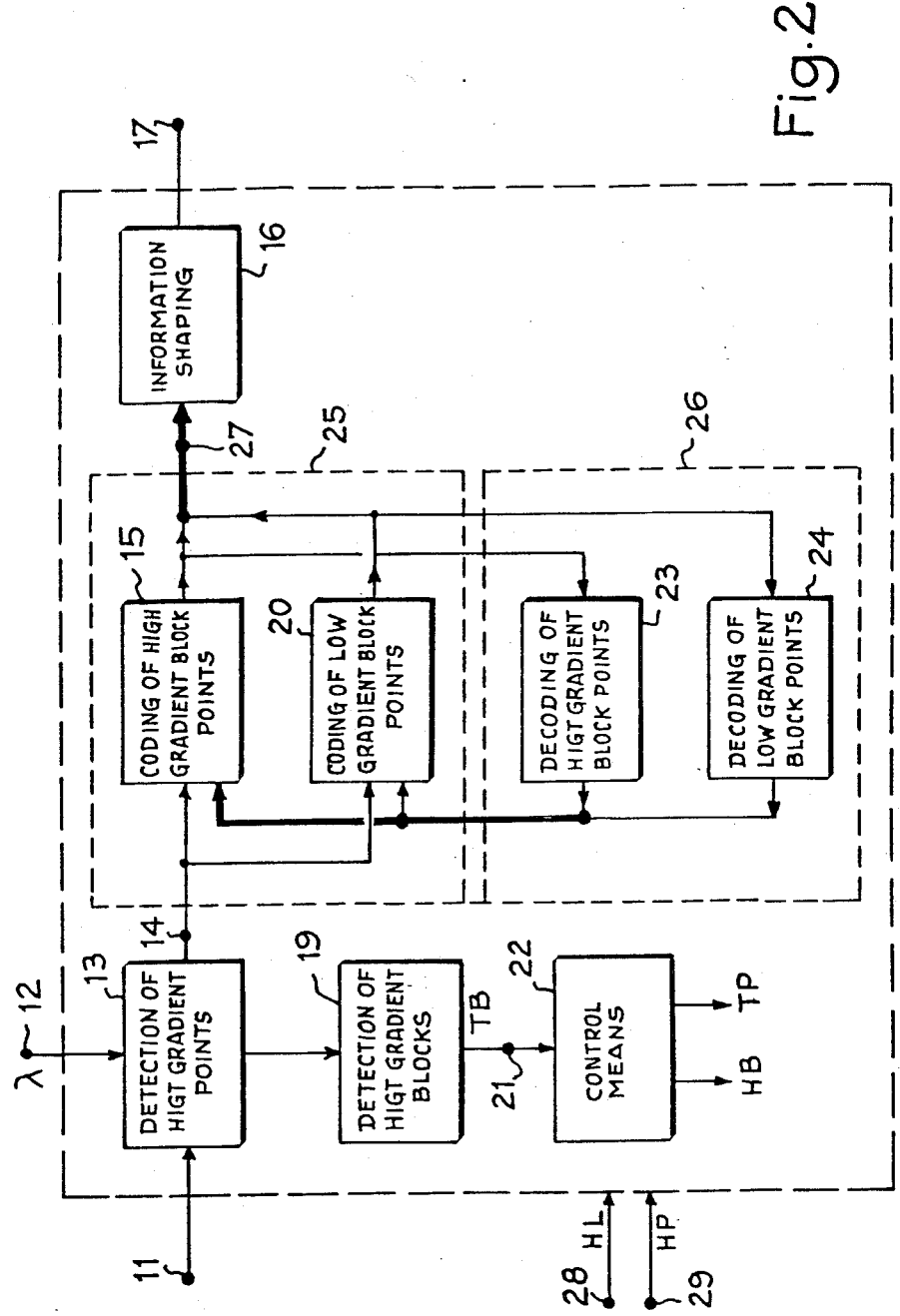
FIG. 2 is a block diagram of an embodiment of a coding device for performing the process according to the invention.

FIG. 2 shows the block diagram of an embodiment of a coding device according to the invention for performing the process described hereinbefore. This device comprises a high gradient point detection device 13, a high gradient block detection device 19, control means 22, coding means 25, decoding means 26 and a coded information shaping device 16. The decoding device according to the invention receives on an input terminal 11 the sequence of digital values of the brightness of the points of a picture and on an input terminal 12 a positive digital value λ. The sequence of brightness values is applied to an input of device 13, the latter restoring it with a certain time lag at an input terminal 14 of coding means 25. Device 13 also has an output connected to an input of the high gradient block detection device 19, in order to supply it with a logic signal, when the brightness value of one point differs from that of an adjacent point on the same line or on a preceding line by an absolute value exceeding λ. Device 19 supplies to an output terminal 21 a logic signal TB indicating the type of block to which belongs the so-called current point which is being coded. Signal TB is supplied to an input of control means 22. The input terminals 28 and 29 of the decoding device according to the invention respectively receive logic signals HL and HP, which are a line sync signal and a point clock or timing signal, which are applied to the different means constituting the decoding device in order to synchronize their operation with the analysis of the picture. These signals are particularly applied to the control means 22 for generating a timing signal HB, or so-called block timing signal, corresponding to the processing of a block of four consecutive points, and a logic signal TP corresponding to the type of current point, as a function of the coding type to be applied thereto: a differential coding for all the points of the high gradient blocks and for the first and third points of the low gradient blocks, and an absence of coding for the second and fourth points of the low gradient blocks. These signals are processed by counters incremented by the point timing signal HP and initialized by the line sync signal HL.

The coding means 25 are constituted by a device 15 for coding the high gradient block points and a device 20 for coding the low gradient block points, having a common input connected to the input terminal 14 of means 25 and a common output connected to an output terminal 27. Decoding means 26 determine a decoded value of the brightness of the current point, as soon as its coded value has been determined. They are constituted by a device 23 for decoding the high gradient block points and a device 24 for decoding the low gradient block points having inputs respectively connected to the outputs of coding device 15 and coding device 20 and having outputs respectively connected to an input of coding device 15 and to an input of coding device 20 and supplying the decoded value of the brightness of the point preceding the current point. The output terminal 27 is connected to an input of the information shaping device 16 and an output thereof constitutes an output terminal 17 of the coding device according to the invention.

FIG. 3 is a more detailed block diagram of the high gradient point detection device 13 and of the high gradient block detection device 19. Device 13 has three single stage registers 32, 34, 35 and one register 33 having a number of stages corresponding to the number of points of one picture line, two calculators 36, 37, two comparators 38, 39 and a logic OR gate 40. Registers 32, 33, 34 and 35 are shift registers controlled by the point timing signal HP. The input of register 32 and the input of register 33 are connected to the input terminal 11 of the decoding device according to the invention and at a considered time receive a brightness value $X_{n+3}{}^j$ represented by 8 bits and corresponding to a point of rank n+3 on a line of rank J. At the same instant, the output of register 32 supplies a brightness value $X_{n+2}{}^j$ to the input of register 34. At the same time, the output of register 33 supplies a brightness value $X_{n+3}{}^{j-1}$ and the output of register 34 supplies a brightness value $X_{n+1}{}^j$ the input of register 35. At the same instant, the output of register 35 supplies a brightness value $X_n{}^j$ to the output terminal 14 of device 13. The brightness value $X_n{}^j$ is that coded at the considered instant and corresponds to a current point of rank n on the line of rank j. At the same instant, it is the brightness gradient of the point of rank n+3 on the line of rank j which is considered by device 13. Calculator 36 has two inputs, respectively receiving the values $X_{N+3}{}^j$ and $X_{n+2}{}^j$ and determine $|X_{n+3}{}^j - X_{n+2}{}^j|$. Calculator 37 has two inputs respectively receiving the values $X_{n+3}{}^j$ and $X_{N+3}{}^{j-1}$ and determines $|X_{n+3}{}^j - X_{n+3}{}^{j-1}|$. Thus, calculators 36 and 37 determine the absolute value of the brightness difference of the point of rank n+3 on the line of rank j compared with the immediately preceding point on the same line and compared with the homologous point on the preceding line. The two values supplied by them are respectively applied to a first input of a comparator 38 and to the first input of a comparator 39. On a second common input, the comparators 38 and 39 receive the value λ applied to the input terminal 12 and have outputs respectively connected to the two inputs of the logic OR gate 40. The output of gate 40 constitutes an output of device 13 and is connected to an input of the high gradient block detection device 19.

Device 19 has four registers 41, 42, 43, 45 and a logic OR gate 44 with four inputs. Registers 41, 42, 43 are single stage registers controlled by the point timing signal HP. Register 45 is a single stage register controlled by the block timing signal HB.

FIG. 4 is a time chart of an example of timing signals HP and HB. Timing signal HB has a four times lower frequency than timing signal HB and its pulses are delayed compared with those of signal HP by a quarter of the cycle of the latter.

At its output terminal 21, device 19 supplies a logic signal TB indicating the block type to which belongs the point, of rank n on the line of rank J, which is being coded. At the considered instant, the output of the OR gate 40 of device 13 supplies a logic signal of value $G_{n+3}{}^j$ indicating whether the point of rank n+3 on the line of rank j is a high gradient or low gradient point and this value is supplied to an input of register 41 and to a first input of OR gate 44. At the same instant, the outputs of registers 41, 42 and 43 respectively supply the values $G_{n+2}{}^j$, $G_{n+1}{}^j$ and $G^j$, indicating whether the points of rank n+2, n+1 and n on the same line are in high gradient form. These values are respectively applied to a second, a third and a fourth input of OR gate 44. The output of OR gate 44 is connected to the input of register 45 and the output of the latter is connected to the output terminal 21 of device 19. When the point of rank n+3 or one of the three points preceding it on the line of rank j is a high gradient point, a logic level 1 is applied to one of the inputs or OR gate 44 and the output thereof supplies a logic level 1 to the input of register 45. The logic level present at the output of gate 44 is stored under the action of timing signal HB. The logic signal of value TP supplied by the output of register 45 than remains constant during the coding of four points and designates the type of block constituted by these four points.

Figure 5:
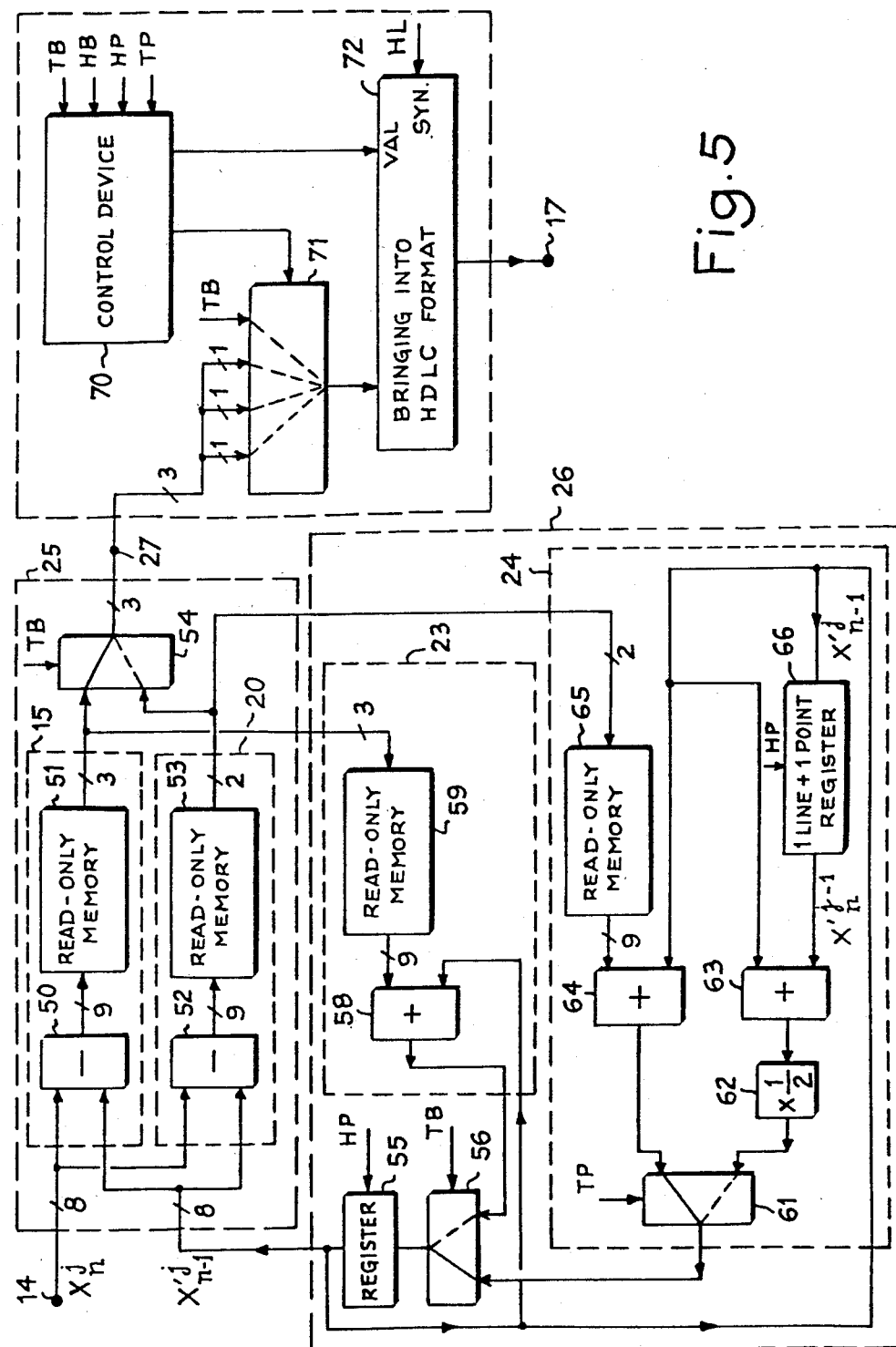

FIG. 5 is a more detailed block diagram of the coding means 25, decoding means 26 and coded information shaping device 16. Means 25 essentially consists of a device 15 for coding the high gradient block points and a device 20 for coding the low gradient block points. Device 15 is constituted by a subtracter 50 and a read-only memory 51, device 20 is constituted by a subtracter 52 and a read-only memory 53. Means 25 also consist of a multiplexer 54 having two inputs and one output, the latter being connected to the output terminal 27 of means 25. The output terminal 14 of the high gradient point detection device 13 supplies, at a considered instant, a brightness value $X_n{}^j$ to a first input of subtracter 50 and to a first input of subtracter 52. An output of the decoding means 26 supplies a value $X'_{n-1}{}^j$, the decoded value of the brightness of the point of rank n−1 on the line of rank j, which is the point preceding the point being loaded at the considered instant. This value is applied to a second input of subtracter 50 and to a second input of subtracter 52. Subtracters 50 and 52 have two outputs respectively connected to an address input of the read-only memory 15 and to an address input of the read-only memory 53. Memories 51 and 53 have two data inputs respectively connected to a first and a second input of multiplexer 54. The value supplied by the outputs of subtracters 50 and 52 range between −255 and +255 and are coded on 9 bits, whereas the values supplied by the data outputs of memories 51 and 53 are coded on three bits and two bits respectively. Subtracters 50 and 52 carry out a differential coding of value $X_n{}^j$ of the point of rank n on the line of rank j compared with the decoded brightness value $X'_{n-1}{}^{j}$ of the immediately preceding point on the same line. In the considered example, the reference point used for the differential coding of the first and third points of the low gradient blocks is constituted by the point immediately preceding the coded point. Subtracters 50 and 52 could be combined into a single subtracter. The read-only memories 51 and 53 carry out a non-linear quantification, which differs for the coding of the high gradient block points and the coding of the low gradient block points. Read-only memory 51 carries out a quantification on a non-linear scale having 8 levels, such that the quantification error on the highest levels is low. Memory 53 carries out a quantification according to a non-linear scale having four levels, so that the quantification error on the lowest values is low. Multiplexer 54 is controlled by logic signal TB, so as to select the value supplied by the output of memory 51 or the value supplied by the output of memory 53, as a function of the block type, this value then being supplied to the output terminal 27.

Decoding means 26 essentially consist of a device 23 for decoding the high gradient block points and a device 24 for decoding the low gradient block points, having two inputs respectively connected to the output of device 15 and to the output of device 20. Means 26 also consist of a multiplexer 56 having two inputs and one output, as well as a single stage register 55, whose output constitutes the output of means 26 and supplies at the considered instant the decoded brightness value $X'_{n-1}{}^{j}$.

Device 23 for decoding the high gradient block points has a read-only memory 59 and an adder 58. The address input of read-only memory 59 constitutes the input of device 23 and receives a value coded on three bits supplied by memory 51. Memory 59 carries out a quantification according to a scale, which is the reverse of that of the quantification carried out by memory 51 and supplies a value coded on 9 bits, which is a brightness difference value. This brightness difference can only assume 8 values, which range between −255 and +255 and which are equal to the quantification threshold values effected for the coding. This value is applied to a first input of adder 58, which receives on a second input the decoded brightness value $X'_{n-1}{}^{j}$ of the previously coded point and supplied by the output of register 55. The output of adder 59 constitutes the output of device 23 and is connected to a first input of multiplexer 56. A second input of multiplexer 56 is connected to an output of device 24 and the output of multiplexer 56 is connected to the input of register 55. Multiplexer 56 is controlled by signal TB, in order to select either the value supplied by device 23 or the value supplied by device 24, as a function of the type of block to which belongs the point being coded in means 25, because its decoding takes place simultaneously in means 26. The decoded value transmitted by multiplexer 56 is stored by register 55 under the action of timing signal HP, so as to be available for the coding and decoding of the brightness value of the next point which is to be processed.

The device 24 for decoding the low gradient block points consists of a read-only memory 65, two adders 63, 64 a shift register 66, a divider by two 62 and a multiplexer 61 having two inputs and one output. A first input of device 24 is constituted by an address input of memory 65 and is connected to the output of device 20 for coding the low gradient block points. Thus, it receives values coded on two bits. A data output of the read-only memory 65 supplies an 8 bit binary word to a first input of adder 64. A second input of adder 64 receives the decoded value $X'_{n-1}{}^{j}$ supplied by the output of register 55. Read-only memory 65 carries out a reverse quantification of the non-linear quantification carried out by memory 53 for coding, i.e. supplies a value between −255 and +255 and equal to one of the coding quantification threshold values. Adder 64 adds the brightness difference value supplied by memory 65 to the decoded brightness value of the previously processed point. Register 66, adder 63 and divider 62 make it possible to reconstitute a brightness value by interpolation. Register 66 has a series input connected to the output of register 55 and a series output connected to a first input of adder 63. A second input of adder 63 is connected to the output of register 55 and an output is connected to the input of divider 62. Register 66 has a number of stages corresponding to one line, plus one point and is controlled by the point timing signal HP. At the considered instant, the series input of register 66 receives the decoded value $X'_{n-1}{}^{j}$ of the brightness of the point preceding the point being coded by means 25 and which is being decoded by means 26 and the series output of register 66 supplies a decoded value $X'_{n}{}^{j-1}$ of the point of rank n on the line of rank j−1. Adder 63 and divider 52 determine the half-sum of values $X'_{n}{}^{j-1}$ and $X'_{n-1}{}^{j}$.

The output of adder 64 supplies a decoded brightness value corresponding to the point of rank n on the line of j rank to a first input of multiplexer 61. At a second input, multiplexer 61 receives the value reconstituted by interpolation and supplied by the output of divider 62. Multiplexer 61 is controlled by logic signal TP, so as to select one of these values as a function of the type of point which is being coded and decoded. If this point is effectively coded, the multiplexer 61 transmits the decoded value supplied by adder 64 and if this point has not been coded, multiplexer 61 transmits the reconstituted brightness value supplied by the output of divider 62. The output of multiplexer 61 constitutes the output of device 24 and is connected to a second input of multiplexer 56.

In a not shown constructional variant, the address inputs of the read-only memories 59 and 65 can be respectively connected to the output of subtracter 50 and to the output of subtracter 52. They then receive 8 bit binary words and supply 8 bit binary words directly giving the values resulting from the coding and decoding quantification succession.

The coded information shaping device 16 incorporates a control device 70, a multiplexer 71 with four inputs and one output and a device 72 for placing in HDLC format. Multiplexer 71 has four inputs, respectively receiving the three bits supplied by the output terminal 27 of the coding means 25 and the bit of signal TB. Multiplexer 71 has an output supplying a bit to an input of device 72 and a control input receiving a binary word supplied by the control device 70 as a function of logic signals TB and TP, as well as timing signals TB and TP. Device 72 also has a validation input (val) and a sync input (syn) respectively receiving a signal supplied by the control device 70 and the line sync signal HL. The output of device 72 is connected to the output terminal 17 of the coding device according to the invention. When control device 70 receives the block timing signal HB, it controls multiplexer 71 in order to transmit the value of signal TB indicating the type of block.

Then, for each pulse of point timing signal HP, multiplexer 71 transmits the value of one of the bits supplied by the output terminal 27 of coding device 25. The control device 70 supplies a validation pulse to the validation input of device 72 for each bit transmitted by multiplexer 71. These pulses are generated at a frequency which is four times higher than that of the point timing signal HP and their number is a function of the value of signals TP and TB. For the first point of a high gradient block, control device 70 controls the transmission of the bit of signal TB and then successively that of each of the three bits of the coded value of the first point. For the three other points of a high gradient block, control device 70 only controls the transmission of the three bits of the coded value. For the first point of a low gradient block, the control device 70 controls the transmission of the bit of signal TB and then successively of the two bits of the coded value of the first point, which are the two least significant bits on terminal 27. Thus, for the third point of a low gradient block, the control device 70 only controls the transmission of the two bits of the coded value. For the second and fourth points of a low gradient block, control device 70 supplies no validation pulses to device 72, so that no bit is transmitted. The transmission of two, three or four bits to device 72 lasts less time than the cycle of the point timing cignal HP. Device 72 transmits coded data in series form by inserting a synchronization word 01111110 at times corresponding to the start of a line, under the control of the line sync signal HL. Furthermore, device 72 adds to the coded data sequence, zeros for preventing the appearance of a sequence 01111110, which could be looked upon as a synchronization word. Output terminal 17 can be connected to a transmission line or to storage means having a data flow rate regulating device according to the prior art.

Figure 6:
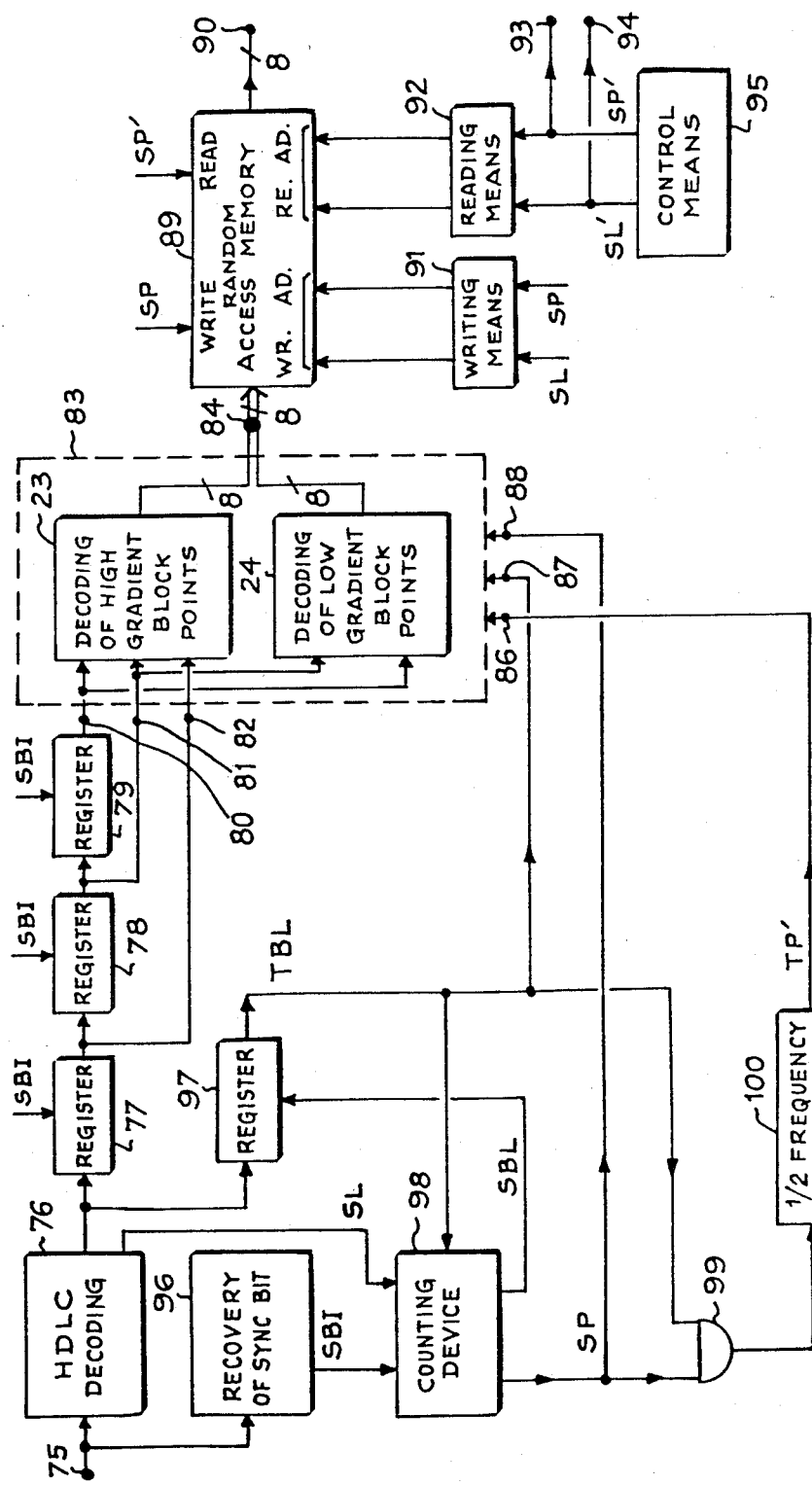
FIG. 6 is the block diagram of an embodiment of a decoding device for performing the process according to the invention.

FIG. 6 shows the block diagram of an embodiment of a decoding device according to the invention. This device comprises a HDLC decoding device 76, three registers 77, 78, 79, means 83 for decoding the points of the blocks, a random access memory 89, a writing address means 91, a reading address means 92, control means 95, a bit synchronization recovery device 96, a register 97, a counting device 98, a logic AND gate 99 and a frequency divider by two 100. The HDLC decoding device 76 has an input connected to an input terminal 75 of the decoding device according to the invention, a first output connected to an input of register 87 and to an input of register 77 and a second output connected to a first input of counting device 98. The bit synchronization recovery device 96 has an input connected to the input terminal 75 and an output connected to a second input of counting device 98. The latter has a third input connected to an input of register 97, a first output connected to a control input of register 97, and a second output connected to a first input of the AND gate 99 and to an input terminal 88 of means 83. A second input of the AND gate 99 is connected to the output of register 97, the latter also being connected to an input terminal 87 of means 83. The frequency divider by two 100 has an input connected to the output of AND gate 99 and an output connected to an input terminal 86 of means 83.

The HDLC decoding device 76 receives by its input terminal 75 a sequence of values, in which it eliminates the zeros which have been added by the HDLC coding device of the coding device according to the invention and detects the words 01111110, which define the coded data corresponding to each line. During the detection of a pattern, device 76 supplies a line synchronization logic signal SL to the first input of counting device 98, in order to start the counting of the points of a line. The bit synchronization recovery device 96 generates a bit synchronization timing signal SBI, synchronized with the binary timing of the coded data received on input terminal 75. This timing signal is applied to timing device 98, where it triggers a counter, in order to divide the frequency of timing signal SBI in the ratio 13 or in the ratio 5, depending on whether the coded data being received corresponds to the points of a high gradient block or to the points of a low gradient block respectively. The counting ratio is selected as a function of the value of a logic signal TBL indicating the type of block and supplied by the outputs of register 97. The timing signal obtained in this way is called the point synchronization signal SP and is supplied to the second output of counting device 98. In addition, counting device 98 has another counter dividing in a ratio of 2 or 4 the frequency of the point synchronization signal SP, as a function of the type of block indicated by logic signal TBL so as to supply at its first output a block synchronization logic signal SBL indicating the start of decoding of each block. Signal SBL is applied to the control input of register 97, in order to store therein the value of the first bit of the coded data of each block. This first bit is the value of the indicator designating the block type. Register 97 supplies the same signal TBL throughout the duration of decoding of a block. Gate 99 transmits signal SP to frequency divider 100 during the decoding of a low gradient point block. The output of frequency divider 100 supplies a logic signal TP' designating the type of each point successively in a low gradient block. Each of the register 77, 78 and 79 has a one bit stage and are connected in series. The HDLC decoding device 76 supplies the input of register 77 with the sequence of binary values received on input terminal 75, after eliminating the patterns 01111110 and the supplementary zeros added to prevent the appearance of this word in the sequence of coded datas. The coded data successively circulate in registers 77, 78 and 79 under the control of the bit sync signal SBI. The outputs of these registers 77, 78 and 79 are also respectively connected to the input terminals 82, 81 and 80 of the decoding means 83.

Random access memory 89 has a data input connected to an output terminal 84 of the decoding means 83, in order to receive an 8 bit binary word, an output connected to the output terminal 90 of the decoding device according to the invention in order to supply it with an 8 bit binary word, a writing control input receiving the signal SP, a reading control input receiving a logic signal SP', first and second writing address inputs respectively connected to two outputs of the writing address means 91, and first and second reading address inputs respectively connected to two outputs of the reading address means 92. The writing . address means 91 has two inputs respectively receiving the line and point sync signals SL and SP. The reading address means 92 has two inputs respectively receiving the syn signals SL' and SP' supplied by two outputs of control means 95. The latter generate signals SL' and SP' for respectively synchronizing the restoration of the lines and the restoration of the points of the images on a display means connected to the output terminal 90. They supply these signals to two output terminals 94 and 93, in order to transmit these sync signals to the display means.

Registers 77, 78 and 79 store the values of three consecutive bits of the sequence of coded data in order to permit a point-by-point decoding, each point being coded by three bits, or two bits, or zero bit. The decoding means 83 supply for each point, even for those points which have not been coded, a decoded brightness value represented by 8 bits. Each decoded brightness value is entered in the random access memory 89, whilst waiting to be restored by the display means. The timing of the transmission of the coded values does not correspond to the analysis timing, because the information quantity to be transmitted varies as a function of the type of blocks and the transmission flow rate is regulated so as to be constant. Memory 89 is used as a buffer, so that its capacity depends on the transmission regulating process. If the transmission has a constant average rate for a fixed number p of lines, memory 89 is then constituted with a capacity corresponding to p lines. The reading and writing addresses of memory 89 are in each case constituted by two binary words, one binary word corresponding to the rank of a line and another binary word to the rank of a point on the line. The reading and writing address means 92, 91 respectively are each constituted by two counters respectively counting the ranks of the lines and the ranks of the points. They are respectively incremented by the line sync signal and the point sync signal. The writing address means 91 receives the sync signals SL and SP, which are determined on the basis of coded information received, whereas the reading address means 92 is incremented by sync signals SL' and SP' generated by the control means 95 and which synchronize the reading of memory 89 with the display.

Means 83 essentially comprise a device 23 for decoding points of the high gradient blocks and a device 24 for decoding points of the low gradient blocks. Means 83 are similar to decoding means 26 of the embodiment of the coding device according to the invention described hereinbefore, with the exception of the control signals. The similar elements of these decoding means 26 and 83 carry the same numerical references in FIGS. 5 and 7.

Figure 7:
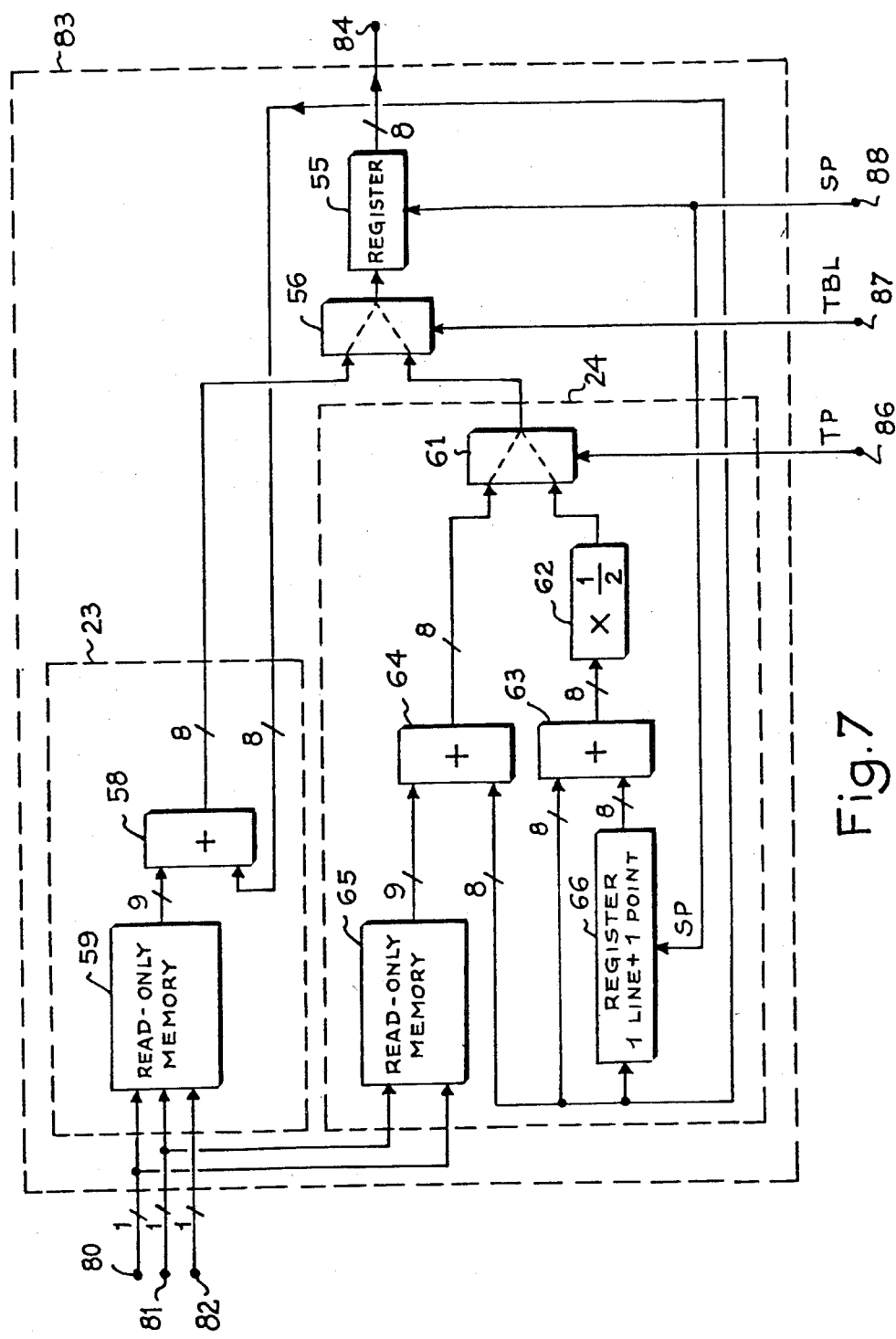
FIG. 7 shows the more detailed block diagram of part of this embodiment of the decoding device.

FIG. 7 is the block diagram of an embodiment of the decoding means 83, which incorporate a device 23 for decoding the points of high gradient blocks, a device 24 for decoding points of low gradient blocks, a multiplexer 56 with two inputs and an output and a register 55. Device 23 has a read-only memory 59 and an adder 58. Memory 59 has an address input receiving three bits supplied by the three input terminals 80, 81 and 82 and has an output supplying nine bits to a first input of adder 58. The latter has a second input receiving 8 bits supplied by the output of register 55 and an output supplying 8 bits to a first input of multiplexer 56. Decoding device 24 has a read-only memory 65, two adders 64, 63, a register 66 having a capacity corresponding to one line, plus one image point, a divider by two 62 and a multiplexer 61 with two inputs and one output. Memory 65 has an address input receiving two bits supplied by the input terminals 80, 81 and has an output supplying 9 bits to a first input of adder 64. The latter has a second input receiving 8 bits supplied by the output of register 55 and an output supplying 8 bits to a first input of multiplexer 61. Adder 63 has a first input receiving 8 bits supplied by the output of register 55, a second input receiving 8 bits supplied by the output of register 66 and an output supplying 8 bits to an input of the divider by two 62. An output of divider 62 is connected to a second input of multiplexer 61. The output of multiplexer 61 is connected to a second input of multiplexer 56. The output of multiplexer 56 is connected to an input of register 55. The output of register 55 is also connected to the output terminal 84 of decoding means 83. The input terminals 86, 87 and 88 of means 83 are respectively connected to a control input of multiplexer 61, a control input of multiplexer 56 and a control input of register 55, in order to respectively supply thereto signals TP', TBL and SP. Under the action of the point sync signal SP, register 55 stores the final brightness value which has been decoded, in order to supply it to decoding devices 23 and 24. Signal TBL, which designates the type of block being decoded, controls multiplexer 56 in order to select either the value decoded by device 23, or the value decoded by device 24. Signal TP', which designates the type of each point of a low gradient block, controls multiplexer 61, in order to select either a value obtained by a decoding opposite to the coding carried out prior to transmission, or a value reconstituted by an interpolation. Input terminal 88 supplies signal SP to a control input of register 66, in order to adjust the brightness value to the decoding timing of the points.

Read-only memory 59 carries out a quantification in accordance with a non-linear scale, which is the reverse of the quantification scale of memory 51 for coding. Adder 58 then adds the value supplied by memory 59 to the brightness value decoded immediately beforehand, in order to obtain a decoded brightness value for the current point. Read-only memory 65 carries out a quantification in accordance with a scale, which is the reverse of that carried out by memory 53 for coding the first and third points of the low gradient blocks. Adder 64 then adds the value supplied by memory 65 to the final brightness value which has been decoded. Adder 65 and the divider by two 62 reconstitute the brightness value of the second or third point of a low gradient block by adding the decoded brightness value of the point preceding the current point and the decoded brightness value of the point following the homologous point of the current point on the preceding line, after which the sum obtained is divided by two. Depending on whether the current point is the first, second, third or fourth point of a low gradient block, multiplexer 61 either transmits the decoded brightness value supplied by adder 64, or the brightness value reconstituted by interpolation and supplied by the output of divider 62.

The invention is not limited to the embodiment described hereinbefore and it in fact falls within the scope of the non-inventive activity of the Expert to differently choose the number of points per block as a function of the nature of the pictures or images, the number and order of the points which are coded in the low gradient blocks, the weighting factors used for the interpolation of the brightness values reconstituted in the low gradient blocks, etc. The invention also covers providing a coding device and a decoding device of the high gradient block points realising a coding and decoding with different quantification scales for the low gradient points and the high gradient points of the high gradient blocks.

The coding and decoding devices according to the invention can be used not only for transmission, but also for storage, e.g. on a magnetic tape. In the latter case, the timing with which the data leave the coding device can differ completely from the timing with which the data enter the decoding device by using different writing and reading speeds. An adaptation of the coding and decoding devices to colour television can be carried out by using three similar devices, one for the brightness signal and one each for the colour difference signals.

What is claimed is:

1. A process for the adaptative coding and the decoding of a television picture, each point in said picture being represented by its brightness value and in which coding consists of:

regrouping the points of the picture in blocks of $N_P$ consecutive points of the same line, $N_P$ being a fixed integer, detecting the points, called high brightness gradient points, whose brightness values differ at least by a value $\lambda$ from that of one of the adjacent points on the same line or on the preceding line;

coding each block, called high brightness gradient blocks, containing at least one high gradient point, by calculating the difference between the brightness value of each point and a value obtained by coding and then decoding the brightness value of the immediately preceding point and by quantifying this difference according to a first non-linear quantification scale, coding each block, called low brightness gradient block, containing no high gradient point, by calculating for at least one point of the block the difference between the brightness value of this point and a value obtained by coding and then decoding the brightness value of a so-called reference point from among the points which have previously been coded, followed by the quantification of the value of this difference according to a second non-linear quantification scale, such that the quantification error is smaller for the low values than for the high values of the difference, distinguishing by a logic indicator, the coded data corresponding to the high gradient blocks on the one hand and those corresponding to the low gradient blocks on the other, and wherein decoding consists of:

identifying the coded data corresponding to the high gradient blocks on the one hand and those corresponding to the low gradient blocks on the other, on the basis of the value of the logic indicator, decoding each high gradient block by determining a decoded value of the brightness of each of its points by a quantification of its coded value in accordance with a reverse scale compared with the first quantification scale used for coding, and by an addition of the thus obtained value and the decoded value of the brightness of the immediately preceding point, decoding each low gradient block by determining a decoded value of the brightness of each point having been coded and belonging to said block by a quantification of its coded value, in accordance with a reverse scale compared with the second quantification scale used for coding, and by an addition of the thus obtained value and the decoded value of the brightness of the corresponding reference point, and by determining a decoded value of the brightness of each point not having been coded and belonging to said block, by an interpolation as a function of the decoded values of the brightness of adjacent points on the same line and on the preceding line.

2. A process according to claim 1, in which the first quantification scale used for coding the points of the high brightness gradient blocks is the same for all the points of said blocks and is such that the quantification errors are lower for the high difference values than for the low difference values.

3. A process according to claim 1, in which the first quantification scale used for coding the points of the high brightness gradient blocks differs between the high gradient points on the one hand and the other points on the other, the quantification scale for the high gradient points being such that the quantification errors are lower for the high difference values than for the low difference values, whilst the quantification scale for the other points is such that the quantification errors are lower for the low values than for the high difference values, whilst also adding to the coded value of the brightness of each point of a high gradient block, a logic indicator indicating whether or not this point has a high gradient.

4. A process according to claim 1, in which the block of $N_p$ points of two successive lines are staggered by a number of points greater than or equal to 1 and less than $N_p$.

5. A device for the adaptative coding of a television picture, whereof each point is represented by the value of its brightness, comprising:

a device for detecting the high brightness gradient points, receiving the digital value of the brightness of each point of a picture and a positive digital value $\lambda$, and supplying a logic signal when the brightness value of one point differs from that of an adjacent point by an absolute value exceeding $\lambda$;

a device for detecting high brightness gradient blocks, coupled to the device for detecting the high brightness gradient points and supplying for each block of $N_p$ consecutive points a logic signal TB indicating whether said block contains at least one high gradient point;

control means receiving the logic signal TB, a line sync signal and a timing signal for each point and generating for each point of the low gradient blocks, a logic signal TB indicating whether said point is to be coded;

means for coding the points, controlled by signal TB, comprising:

a device for coding the points of the high gradient blocks successively receiving the brightness value of each point of the high gradient blocks and a decoded value of the brightness of the preceding point for supplying a value coded by a differential code and a quantification according to a first non-linear scale;

a device for coding the points of the low gradient blocks controlled by the signal TP and successively receiving the brightness value of each point of the low gradient blocks and a decoded value of the brightness of a corresponding reference point, in order to supply a value coded by a differential code and a quantification according to a second non-linear scale, in the case where a point is coded;

means for decoding the points, controlled by the signal TB, in order to supply the means for coding the points with a decoded value of the brightness of the point preceding the point being coded and comprising:

a device for the decoding of the points of the high gradient blocks, in order to quantify the coded value of the brightness of each point of the high gradient blocks in accordance with a non-linear scale, which is the reverse of the first quantification scale used for the coding. and adding to the thus obtained value the decoded value of the brightness of the previously decoded point;

a device for decoding the points of the low gradient blocks controlled by signals TB and TP, in order to quantify the coded value of the brightness of each point which is coded and which belongs to a low gradient block, in accordance with a non-linear scale, which is the reverse of the second quantification scale used for the coding, and for adding to the thus obtained value, the decoded value of the brightness of the previously decoded point, and for calculating, for each uncoded point of the low gradient blocks, a decoded brightness value equal to a value interpolated on the basis of the brightness values of adjacent points on the same line and on the preceding line and which has previously been decoded;

a device for shaping the coded information supplied by the coding means for adding to the coded brightness values of the points of each block, the value of the logic signal TB in order to indicate whether said block has a high gradient.

6. A decoding device for a television picture comprising:

means for receiving the coded data extracting a logic signal TBL so distinguishing those corresponding to high gradient blocks and those corresponding to low gradient blocks and deducing therefrom a logic signal TP' designating the points belonging to low gradient blocks and which have not been coded;

means for storing the coded brightness value of a point during its decoding;

means for decoding the points of the high gradient blocks controlled by signal TBL, in order to quantify the coded brightness value of each point of the high gradient blocks, in accordance with a non-linear scale, which is the reverse of the first quantification scale used for the coding and adding to the thus obtained value the decoded value of the brightness of the previously decoded point;

a device for decoding the points of the low gradient blocks controlled by signals, in order to quantify the coded value of the brightness of each point which has been coded and which belongs to a low gradient block, in accordance with a non-linear scale, which is the reverse of the second quantification scale used for the coding, and for adding to the thus obtained value the decoded value of the brightness of the previously decoded point, and for calculating for each uncoded point of the low gradient blocks, a decoded brightness value equal to a value interpolated on the basis of the brightness values of adjacent points on the same line and on the preceding line and which have previously been decoded;

as well as a memory for storing the decoded brightness value supplied by the decoding means with the timing at which the coded values are received, and for restoring them with a constant timing at an output of the decoding device.

* * * * *